United States Patent
Xiao et al.

(10) Patent No.: US 12,212,869 B1
(45) Date of Patent: Jan. 28, 2025

(54) HIGH-SPEED CMOS PIXEL DETECTOR

(71) Applicant: Central China Normal University, Hubei (CN)

(72) Inventors: Le Xiao, Wuhan (CN); Xiangming Sun, Wuhan (CN); Bihui You, Wuhan (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 18/762,876

(22) Filed: Jul. 3, 2024

(30) Foreign Application Priority Data

Jul. 5, 2023 (CN) .......................... 202310813965.1

(51) Int. Cl.
*H04N 25/767* (2023.01)
*H04N 25/78* (2023.01)

(52) U.S. Cl.
CPC .......... *H04N 25/767* (2023.01); *H04N 25/78* (2023.01)

(58) Field of Classification Search
None
See application file for complete search history.

(56) References Cited

U.S. PATENT DOCUMENTS

2020/0412992 A1* 12/2020 Kobayashi ............. H04N 25/75

OTHER PUBLICATIONS

First Chinese Office Action with English Translation, Application No. 202310813965.1, Issue No. 2023081001590730, Applicant: Central China Normal University, Title: High Speed CMOS Pixel Detector, Dated: Aug. 10, 2023.
Notification to Grant Patent Right for Invention with English Translation, Application N.: 202310813965.1, Issue No. 2023083000249600, Applicant: Central China Normal University, Title: High Speed CMOS Pixel Detector, Dated: Aug. 30, 2023.

* cited by examiner

*Primary Examiner* — Mark T Monk
(74) *Attorney, Agent, or Firm* — Reising Ethington P.C.

(57) ABSTRACT

A high-speed CMOS pixel detector is provided, which includes a plurality of super pixel modules, where each super pixel module includes an array of N×M super pixel cells and a digital readout logic circuit connected to the N×M super pixel cells, and data is output between the super pixel modules via asynchronous control logic; and peripheral modules, including at least an EoC module, a peripheral readout module, and a peripheral data transmission module connected in sequence, where the EoC module is connected to the super pixel modules. This application adopts a structure in which a plurality of super pixel cells are integrated, allowing for upgrading of a serial sparse readout mode to a parallel sparse readout mode, thereby greatly improving a readout rate, enabling a plurality of pixels to share resources, and reducing pixel dimensions.

8 Claims, 6 Drawing Sheets

HIGH-SPEED CMOS PIXEL DETECTOR

CROSS REFERENCE TO RELATED APPLICATION

This patent application claims the benefit and priority of Chinese Patent Application No. 202310813965.1 filed with the China National Intellectual Property Administration on Jul. 5, 2023, the disclosure of which is incorporated by reference herein in its entirety as part of the present application.

TECHNICAL FIELD

The present disclosure relates to the field of semiconductors, and in particular, to a high-speed complementary metal-oxide-semiconductor (CMOS) pixel detector.

BACKGROUND

Currently, silicon pixel detectors are used in most experiments as vertex detectors, including two types: hybrid pixel array detectors (PADs) and monolithic active pixel sensors (MAPSs). The hybrid PADs are characterized by the separation of the sensor portion of the detector from the front-end electronics portion, and metal balls are welded in between. The manufacturing process is relatively complex and expensive. In the MAPS, a silicon epitaxial layer is used as the sensing part and implemented in the same chip as the front-end electronics, allowing for low-power, high-speed, and low-noise monolithic sensors using a low-cost CMOS process. The hybrid PAD has another disadvantage of being thicker, with a thickness generally over 200 μm to 250 μm, while the MAPS has a thickness that currently can reach 50 μm and can be further reduced. For the vertex track detector, the low mass characteristic of the MAPS may reduce the multiple scattering effect of particles in semiconductors, alleviating the deviation of the particles from the direction of incidence due to scattering and reducing the energy loss. For the next-generation vertex detector, pixel sizes will be further reduced, not only to achieve better position resolution, but also to maintain low pixel occupancy at high particle rates, alleviating the problem of pixel hit stacking. However, the pixel size of the hybrid chip is limited by the metal ball soldering process.

In recent years, the MAPSs have been widely used in various fields such as digital cameras, video cameras, nuclear and particle physics, astrophysics, cosmic ray science, and medical imaging. The use of triple-well and quadruple-well processes resolves the problem that PMOS cannot be used in front-end circuits, allowing relatively complex signal processing circuits and sparse readout architectures to be designed within pixels, thereby improving a readout speed and reducing power consumption. In recent years, newer deep-submicron CMOS processes have been constantly used for MAPS chips to enhance the radiation tolerance of the chips. In addition, the depleted MAPS (DMAPS) with sensitive region depletion has been achieved in the CMOS process by using a high-resistance epitaxial layer and a substrate high voltage bias. The DMAPS collects charges by drift rather than diffusion, dramatically improving the radiation tolerance of the MAPS. However, to meet the requirements of future experiments, in addition to radiation tolerance, the readout speed of the MAPS still needs to be further improved.

Currently, the most advanced MAPS chips in the world are ULTIMATE chips used for Solenoidal Tracker at Relativistic Heavy Ion Collider (RHIC) (STAR) experiments, A Large Ion Collider Experiment (ALICE) pixel detector (ALPIDE) chips used for ALICE experiments, and Monopix chips to be used for inner tracker (ITk) upgrade in ATLAS experiments. The ULTIMATE uses the conventional rolling-shutter readout architecture to output binary information indicating whether a pixel is hit. An integration time of 185.6 μs and a power density of 130 mw/cm$^2$ are achieved with a 928×960 pixel array (with a pitch of 20.7 μm). For a given clock frequency, the integration time of the rolling shutter depends on a row quantity of the pixel array. A frame readout time can be reduced by increasing a quantity of column-level discriminators and using multi-row parallel readout. However, in the absence of any type of data compression within the pixel array, such a reduction in frame readout time is accompanied by an increase in power consumption. For both ALPIDE and Monopix, a data-driven sparse readout architecture is used in the pixel array to read only pixels that are hit. This architecture is quite efficient for high energy physics experiments with low hit pixel occupancy, reducing both the readout time and the readout power consumption. For ALPIDE, addresses of hit pixels are output based on a dual-column data bus readout architecture of a priority arbitration tree. Address information of the hit pixels in the two columns is transmitted to the end of column (EoC) through an address bus in sequence according to the arbitration tree of a hierarchical structure. In addition, in ALPIDE, the arbitration structure and the address bus are tightly "coupled", and an arbitration result of each level is an output result of the address bus of each level. In ALPIDE, an integration time of less than 10 μs and a power density of 40 mw/cm$^2$ [5] are achieved with a 512×1024 pixel array (with a pitch of 28 μm). For a prototype chip of Monopix, addresses of hit pixels, as well as arrival and end times of the hits, are output based on a dual-column data bus readout architecture of a token-ring arbitration. Because time information further needs to be output, a priority tree structure in which an arbitration and an address bus are tightly "coupled" is not used in Monopix. Pixels in the two columns transmit addresses and times to the end of column through the bus in sequence according to chained token arbitration. There are also some advanced MAPS chips that are a series of vertex detector prototype chips developed in advance for Circular Electron Positron Collider (CEPC), including a MIC4 chip developed by a silicon pixel laboratory. MIC4 uses the same process as ALPIDE, with a 128×64 pixel array and a pixel pitch of 25 μm. To meet a high spatial resolution requirement of a CEPC application, a readout architecture of MIC4 is optimized based on ALPIDE. A column bus readout mode that combines chain arbitration and priority tree arbitration is used to output an address of a hit pixel. An array of MIC4 is divided into many super pixels, each super pixel including 8×8 pixels. Chain arbitration and address projection solutions are used inside the super pixel. For each super pixel, a two-dimensional projection (X and Y directions) is used to identify an address of each hit pixel. Compared with the priority arbitration tree, the solution has no priority encoding logic within the pixel, and therefore, the pixel is smaller. Considering the impact of a transmission delay of the chain arbitration on the readout speed, the length of the chain should not be too long. Therefore, a priority tree with a hierarchical structure is used for the arbitration between super pixels. The tree structure can reduce a length of a line, thereby reducing a capacitive load of the line, and has lower dynamic power consumption and a faster readout speed than the chain structure.

In general, ALPIDE, Monopix, and MIC4 each use a different sparse readout mode according to respective application requirements. Compared with a conventional rolling shutter readout mode of ULTIMATE full-pixel scanning, a data volume is greatly compressed because only hit pixels are read. In this way, the readout time and power consumption are reduced. However, currently, these readout architectures still cannot meet requirements of the next-generation high-hit-rate particle physics experiments, and the rates of the readout architectures need to be further improved.

Through the study of the most advanced MAPS chips in the world currently and the experience gained by the applicants in designing the MIC4 chip, it is found that the current data-driven readout architecture of these chips still has a lot of room for optimization to improve the readout rate.

First, in the current readout architecture, hit pixels are read one by one in a particular order to the end of the chip array by means of arbitration, and then processed by the peripheral modules. Essentially, this is a serial readout architecture, where information of only one hit pixel can be read out during one readout process, greatly limiting the readout rate.

Second, during the readout of each hit pixel, the current architecture requires an interaction of information between the pixel and the EoC module. This is essentially a global readout architecture, and the interaction process requires the signal to travel a long distance on the chip, and a capacitive load is relatively large. This not only limits the readout frequency, but also increases power consumption. Especially, when the newer CMOS processes are used, an on-chip wiring delay is not reduced as much as a gate delay. In addition, the deep-submicron CMOS processes allow for continuously improved functional density of pixel circuits, creating opportunities for the development of novel readout architectures.

However, a super pixel parallel sparse readout technology is to divide a pixel array into many super pixels, each super pixel consisting of a plurality of pixels. Dimensions of the super pixel may be 2×2, 2×4, 2×8, 3×3, 4×4, or the like. All the pixels in the super pixel share a digital readout logic circuit. When a pixel in the super pixel is hit, shape information (HitMap) data of the hit pixel in the super pixel is read out in parallel at a time through the sparse readout circuit. For example, for a 2×4 super pixel, 8 bits of data are used to identify a hit pixel distribution status of the super pixel. Such a parallel sparse readout technology based on super pixels not only increases the readout rate by a plurality of times, but also further compresses the data that needs to be read out. This is because an aggregation feature of a hit pixel cluster in a pixel detector is used, enabling all pixels in the hit pixel cluster to share one piece of address information. In addition, all the pixels in the super pixel are enabled to share a set of digital readout logic, such that dimensions of the pixels can be further reduced.

The node-based distributed column readout architecture technology gets rid of a global readout architecture based on a column bus. Each super pixel includes a readout data node. Each node receives data from a local super pixel or data from a previous node. The data nodes communicate locally with each other, and propagate data downward in columns through registers in the nodes. This solution is completely data-driven and decentralized. This means that no global controller is required to initiate data transmission between the nodes. A node starts data transmission only when there is valid data to be transmitted. This also means that when the distribution of hit pixels is not uniform, if there is a node with a higher input data rate and a next node has a lower input rate, the node can send the data quickly to the next node. In this case, the nodes in the structure serve as distributed data buffers. There is no direction connection from the top to the EoC like a bus, and a plurality of pieces of data can move between different nodes at the same time. Compared with the bus structure, this "pipeline"-like structure greatly increases the readout rate. In addition, the node-based structure is scalable for the enlargement of the pixel array. As for the newer CMOS processes, especially, although the wiring delay increases, the more closely placed nodes overcome this disadvantage and a logic gate delay is greatly reduced, allowing for working at a higher frequency.

The combination of a clockless technology based on an asynchronous circuit and the node-based column readout architecture technology can provide many beneficial effects. Asynchronous circuits have been developed quickly in the field of brain-like computing chips and artificial intelligence (AI) chips in recent years. There is no global clock in an asynchronous circuit, and previous and next stages directly inform each other, by sending handshake signals, whether data can be received. A bundled-data mechanism in which data and a control signal are bundled together is used. The control signal plays the role of a clock signal in a synchronous circuit. A minimum clock cycle of the synchronous circuit needs to ensure that the circuit can still work correctly under the worst conditions of signal transmission. Therefore, the overall performance is limited by the worst point. However, in an asynchronous design, the time it takes to complete an operation at each stage is relevant only to the current stage, and the overall performance is an average result. Therefore, the asynchronous design may outperform the synchronous circuit as a whole. The asynchronous circuit can also "automatically" slow down when changes in temperature, voltage, and other conditions cause a circuit delay to increase, without causing any functional errors. The asynchronous circuit further has an important benefit of low power consumption, because the asynchronous circuit does not work when there is no data changing. This is suitable for a data-driven readout architecture in a pixel chip. In addition, an energy-draining global clock distribution network in a pixel array is omitted and the time required for designing a complex global clock network is saved. Low power consumption means that the detector does not need a complex cooling mechanism, further reducing the mass of the detector. The absence of the clock network in the pixel array also greatly reduces noise from a digital circuit to an analog front end. Although the asynchronous circuit requires an additional area to implement a handshake control circuit, this problem is to be resolved as the MAPSs gradually shift to newer CMOS processes and chip functional density is thus improved.

SUMMARY

In view of the foregoing problems in the prior art, the present disclosure proposes for the first time in an MAPS pixel chip the use of a parallel sparse readout technology based on super pixels, a node-based distributed column readout architecture technology, and a clockless technology based on an asynchronous circuit to improve the performance of the pixel chip.

The foregoing technical problems of the present disclosure are solved mainly by the following technical solution:

A high-speed CMOS pixel detector includes:

a plurality of super pixel modules, where each super pixel module includes an array of N×M super pixel cells and a digital readout logic circuit connected to the N×M super pixel cells, and data is output between super pixel modules via asynchronous control logic; and peripheral modulse, including at least an EoC module, a peripheral readout module, and a peripheral data transmission module connected in sequence, where the EoC module is connected to the super pixel modules.

Preferably, the digital readout logic circuit includes:

a HitMap cache, configured to cache hit information of hit super pixel cells;

a readout node, configured to transmit data in the HitMap cache and a row address of a super pixel to an outside (end) of a pixel array, where at the end of the pixel array is a peripheral circuit module, including an EoC module, a peripheral readout module, and a peripheral data transmission module, and configured to receive data from the pixel array and process the data; where the data from the pixel array is first received by the EoC module, then sent to the peripheral readout module for data processing, and finally transmitted out of the pixel chip by the peripheral data transmission module; and configuration logic, configured to configure pixel cells in the super pixel; and configure a switch inside a pixel, such as: (1) a pixel shielding switch, to turn on or off a response of a pixel to a signal; or (2) a pixel test excitation switch, to turn on or off a test excitation signal enable switch of a pixel.

Preferably, the readout node includes at least an asynchronous control logic circuit, including a plurality of registers, configured to store data output by a multiplexer;

the multiplexer, configured to select data generated by super pixel cells in anode or data from super pixel cells in a previous node for output; and an arbiter, configured to control a selection of the multiplexer.

The specific implementation herein adopts the asynchronous control logic circuit, or may adopt synchronous control logic to implement the "parallel, distributed, and sparse readout technology based on super pixels".

A single register does not have the property of "shifting". A shift register is a linear structure consisting of a plurality of registers, and data can be moved along the linear structure. Therefore, it is referred to as a shift register. In the technology of this patent, data is also moved in a structure consisting of a plurality of nodes, similar to the property of a "shift register". However, a multiplexer and an arbiter are used for each node. This makes the structure not completely linear. Data can be injected directly at an intermediate node, while for the shift register, data can be injected only at a starting point.

Preferably, when one of two inputs to the node is valid, the arbiter controls the multiplexer to transmit a valid input to a register; and when both inputs to the node are valid, the arbiter controls the multiplexer to prioritize transmission of data generated by a local super pixel.

Preferably, each super pixel cell includes an induction diode and an analog front-end circuit that are sequentially connected, where the induction diode is configured to collect an induction signal generated during a hit; and the analog front-end circuit is configured to amplify, shape, and digitize a small signal generated by the induction diode, where when a pixel in the super pixel is hit, hit information of all pixel cells in the super pixel is written into the HitMap cache.

Preferably, the arbiter performs data control selection based on a local arbitration algorithm, including:

a weighted round-robin algorithm, where for every t conflicts, the local super pixel is granted access to a data node, meaning that each arbiter in a column is weighted with an address of the data node;

a longest-wait-first algorithm, where each data node further needs to store a waiting time of each packet, a waiting counter is incremented only in case of a conflict, and a packet with a long waiting time obtains access to the node; or an oldest-cell-first algorithm, where timestamps of two packets are compared and a packet with a smaller timestamp is always selected.

Preferably, readout nodes of the super pixel modules communicate locally with each other, and propagate data downward in columns through registers in the readout nodes, during data transmission, a node-based readout architecture having a hierarchical structure with at least two layers is set, and the hierarchical structure with at least two layers including:

a first node layer, including readout nodes of at least two super pixel modules, where an output of the first node layer is as a first node layer output; and a second node layer, including a plurality of first node layer outputs.

Preferably, the readout node of each super pixel module performs data communication based on an asynchronous four-phase handshake protocol, including:

a transmitting end sends data first and sets a request signal (Req) to a high level;

a receiving end receives the data and sets an acknowledgement signal (Ack) to the high level;

the transmitting end receives the acknowledgement signal (Ack) and then sets the request signal (Req) to a low level; and the receiving end sets the acknowledgement signal (Ack) to the low level after the request signal (Req) switches to the low level.

Preferably, in the peripheral module, the EoC module is configured to perform a handshake with a column, receive a data packet from the column, store the data packet in a first in, first out (FIFO), and then synchronize data to a peripheral clock domain, where the EoC module adds an address of a super pixel column to each packet, for subsequent identification;

the peripheral readout module is configured to read data from the EoC module in each column, and send the data to the peripheral data transmission module; and the peripheral data transmission module is configured to frame and encode data sent by the peripheral readout module, perform parallel-to-serial conversion on the data, and then output the data at a high speed.

Preferably, in the peripheral modules, a slow control and command decoder is configured to receive and parse data from outside a chip, and then implement a register configuration based on information obtained through parsing; and a configuration register is configured to configure a working state of a circuit in the chip.

Therefore, the present disclosure has the following advantages: 1. A structure in which a plurality of super pixel cells are integrated is adopted, allowing for upgrading of a serial sparse readout mode to a parallel sparse readout mode, thereby greatly improving a readout rate, enabling a plurality of pixels to share resources, and reducing pixel dimensions. 2. Nodes of a plurality of layers are used for data transmission. This can get rid of a global readout architecture based on a column bus, implement data-driven and decentralized readout, improve readout efficiency, reduce power consumption, and achieve good scalability.

DETAILED DESCRIPTION OF THE EMBODIMENTS

Figure 1:
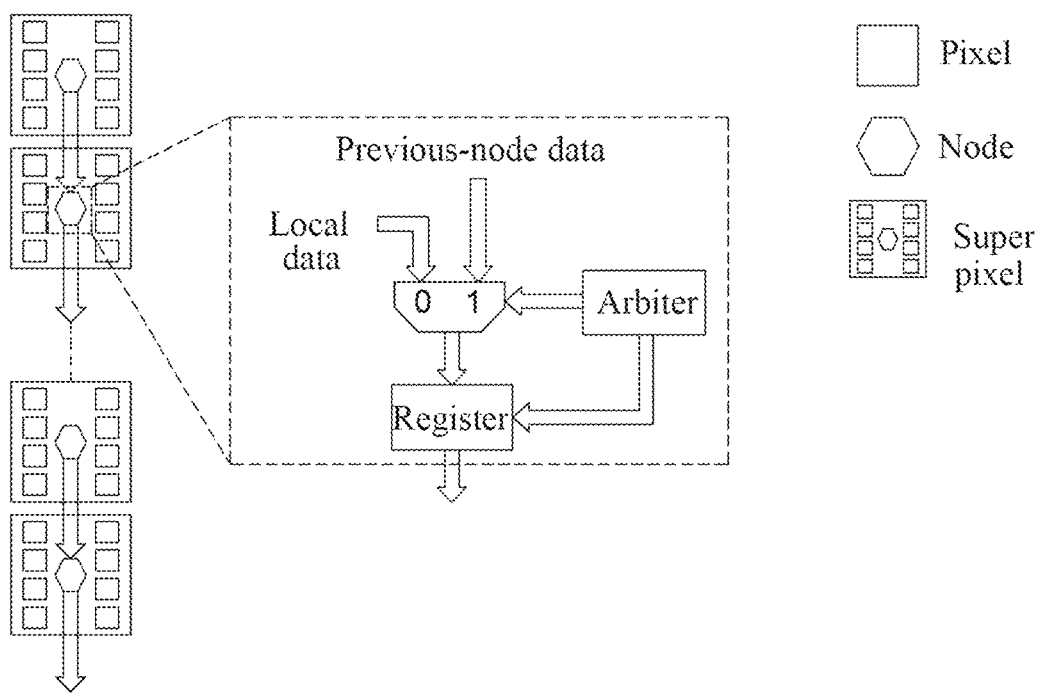
FIG. 1 is a diagram of a linear node column readout architecture according to the present disclosure.

The technical solutions of the present disclosure are further specifically described below through embodiments with reference to the accompanying drawings.

EMBODIMENT

The following describes in detail a process of designing and implementing a novel high-speed CMOS pixel detector involved in this embodiment.

I. Hardware Part. The Present Disclosure Mainly Includes Super Pixel Modules and Peripheral Modules.

(1) Design and Implementation of Super Pixels.

A super pixel usually includes a plurality of pixel cells and a logic circuit shared by the plurality of pixel cells. The shared circuit includes: a HitMap cache, a readout node, and configuration logic. An induction diode and an analog front-end circuit are integrated in each pixel cell. The induction diode is configured to collect an induction signal generated during a hit. The analog front-end circuit is responsible for amplifying, shaping, and digitizing a small signal generated by the induction diode. When a pixel in the super pixel is hit, hit information of all pixel cells in the super pixel is written into the HitMap cache, and the analog front-end circuit is reset, such that the pixel cell responds to a next hit. A next hit event can be processed immediately as long as there is room in the HitMap cache, greatly reducing dead time. The readout node transmits data in the HitMap cache and a row address of the super pixel to the outside (end) of a pixel array. The configuration logic completes configuration of the pixel cells in the super pixel.

(a) Optimization of HitMap cache depth. In a high energy physics experiment application, a hit rate of pixels is subject to a Poisson distribution. When a pixel instantaneous hit rate is high, in order to alleviate a problem of hit stacking, the HitMap cache needs to be as large as possible. However, an extremely large cache may lead to an increase in a pixel area. An increase in a column readout rate can lower a size requirement of the HitMap cache. Therefore, systematic design needs to be performed according to the hit rate of pixels and the column readout rate of super pixels to find an optimal depth of the HitMap cache.

(b) Optimization of super pixel dimension. The super pixel dimension refers to how many pixels there are in horizontal and vertical dimensions, respectively. In principle, increasing the super pixel dimension can both improve a parallelism of reading out hit pixels and enable more hit pixels to share address information to compress a data volume. However, this needs to be optimized according to a size of a hit pixel cluster in the application. An extremely large super pixel dimension may instead waste parallel bandwidth, increase a volume of invalid data, and reduce efficiency. Increasing the super pixel dimension can also reduce a total quantity of readout data nodes in a column, thus reducing a time it takes for data to be transmitted to an EoC. However, this also increases a distance between nodes for signal transmission and increases a load on signal lines. Increasing the super pixel dimension can also enable more pixels to share readout logic, thereby reducing hardware overheads and shrink pixel area.

(2) Design and Implementation of the Peripheral Modules.

The peripheral modules mainly include an EoC module, a peripheral readout module, a peripheral data transmission module, a slow control and command decoder, and a configuration register. Other peripheral analog modules irrelevant to readout are implemented by using mature solutions of an organization, such as a DAC and a bandgap reference source. Different from a column readout architecture, peripheral digital modules are to adopt a clock-driven synchronous circuit.

(a) Design of the EoC module. The EoC module is responsible for performing a handshake with a column, receiving a data packet from the column, storing the data packet in a FIFO, and then synchronizing the data to a peripheral clock domain. The EoC module adds an address of a super pixel column to each packet, for subsequent identification;

(b) Design of the peripheral readout module. The peripheral readout module is responsible for reading data from an EoC module in each column, and sending the data to the peripheral data transmission module. In order to adapt to a high readout rate of an array, the peripheral readout circuit also needs to increase a rate thereof. A data readout circuit structure in the proposed peripheral modules is similar to the column readout architecture, but adopts a synchronous design, and each node includes a FIFO instead of a register. This makes it possible to send and receive data packets at each clock cycle without blocking. In addition, a plurality of groups of read EoC modules with interleaving readout structures are used. For example, the EoC modules of an even-numbered column and those of an odd-numbered column each use a readout structure. In this way, a data flow from the pixel array can be distributed more evenly to a plurality of readout structures, avoiding excessive congestion in a few readout structures.

(c) Design of the peripheral data transmission module. The peripheral data transmission module is responsible for framing, encoding, performing parallel-to-serial conversion on, and then outputting at a high speed the data sent by the peripheral readout module. A framer adds, to the data, a fixed frame header for frame synchronization on a receiver side, and a check code for data check on the receiver side. Each data packet is encoded through a scrambler. The scrambler allows the data to have a better direct current balance property without adding extra data space, and the receiver can recover a clock therefrom. The proposed peripheral data transmission module is to use a plurality of serial data transmission channels to output data generated by a chip. Each transmission channel includes a framer, a scrambler, and a parallel-to-serial converter. A crossbar switch module is responsible for mapping the data sent by the peripheral readout module to any serial data transmission channel. In this way, advantageously, any channel can be turned off to reduce power consumption if not the entire bandwidth is required.

II. Data Transmission Part.

(1) Design of a Node-Based Distributed Column Readout Architecture.

As described above, each super pixel includes a data readout node. Each node consists of a register, a multiplexer, an arbiter, and other circuits. The multiplexer selects one of data inputs of each node, data generated by the local super pixel or data from a previous node, and sends the data to the register in the node. The register is configured to store the data output by the multiplexer. The arbiter in the node is configured to control a selection of the multiplexer. A working process of the arbiter is as follows: when one of two inputs to the node is valid, the arbiter controls the multiplexer to transmit a valid input to the register; and when both the inputs to the node are valid, the arbiter controls the multiplexer to prioritize transmission of data generated by the local super pixel. The node uses the multiplexer and the arbiter to select the prioritized data to be transmitted. Data nodes communicate locally with each other, and propagate data downward in the columns through the registers in the nodes. The node-based distributed column readout architecture includes an arbitration algorithm and a hierarchical node column readout architecture.

(a) Arbitration algorithm. As shown in FIG. 1, for a linear node column readout architecture, data generated by each node needs to be transmitted to the EoC through a series of nodes below. A node closer to the EoC has larger data load. In such an asymmetric topology structure, if locally each node gives equal priority to local super pixel data and upper-level node data, it may instead lead to unfair arbitration in general. This is because it will cause that a super pixel at the EoC has a priority of ½, a super pixel second close to the EoC has a priority of ¼, and an nth super pixel on top has a priority of ½". The unfair arbitration causes congestion of hit data, and an increase in a delay in reaching the EoC. To cause each super pixel to be arbitrated as fairly as possible globally, a local arbitration algorithm of the node needs to be studied, such as a Weighted Round-Robin (WRR) algorithm, a Longest-Wait-First (LWF) algorithm, or an Oldest-Cell-First (OCF) algorithm. In WRR, for every t conflicts, the local super pixel is granted access to a data node. This means that each arbiter in a column is weighted by using an address of the data node. In LWF, each data node further needs to store a waiting time of each packet. A waiting counter is incremented only in case of a conflict. A packet with a longer waiting time obtains access to the node. In OCF, timestamps of two packets are compared and a packet with smaller timestamp is always selected. The impact of different arbitration algorithms on performance of the readout architecture needs to be studied, including rates, delays, and overheads.

Figure 2:
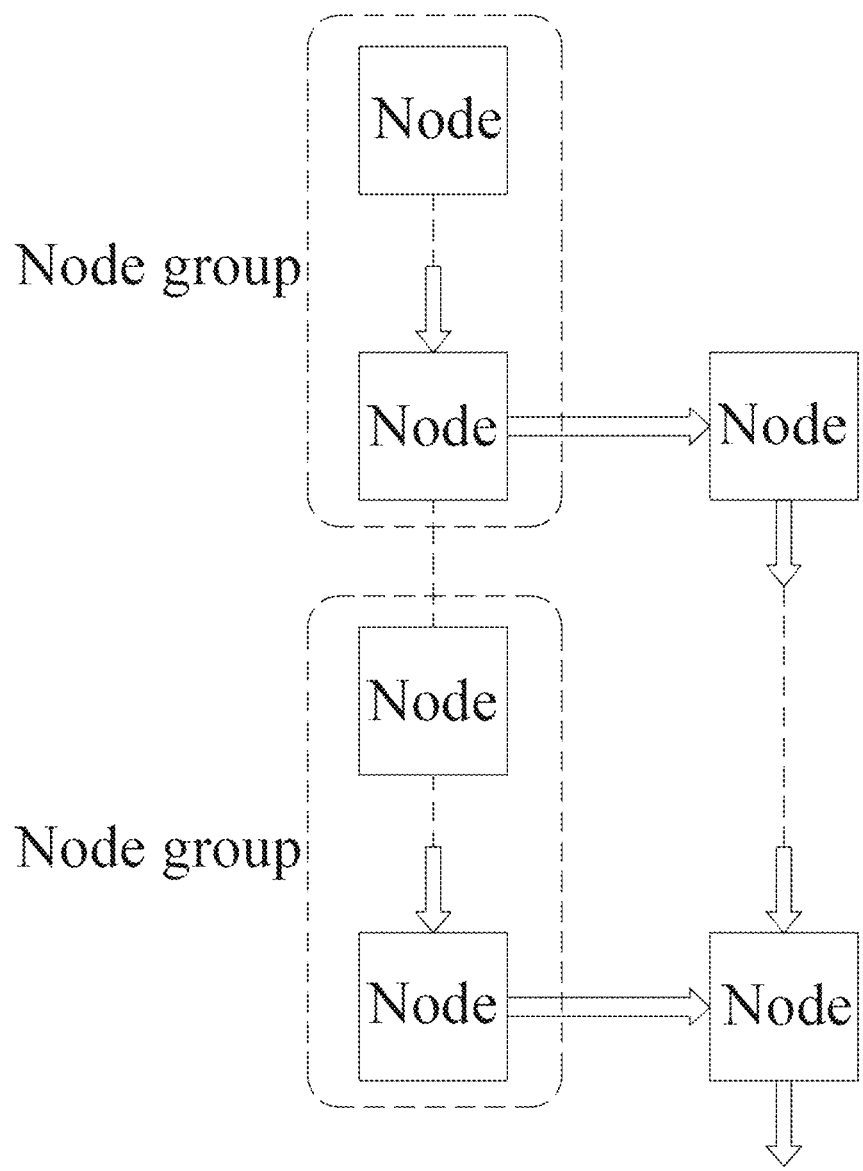
FIG. 2 is a diagram of a hierarchical node column readout architecture with a two-layer structure according to the present disclosure.

(b) Hierarchical node column readout architecture. For a linear node architecture, a larger quantity of nodes in a column indicates a larger data transmission delay. To reduce fixed and non-congestion-based delays, especially when a pixel array is relatively large, node groups may be used to create hierarchical structures, where the longest chain of nodes is no longer determined by a total quantity of nodes in the structure. This also reduces a quantity of operations required to transfer data out of the structure, thereby reducing power consumption. FIG. 2 shows a node-based readout architecture with a two-layer hierarchy. Each node has a structure similar to that shown in FIG. 1. A node arbitration algorithm also affects a readout delay of a hierarchical node architecture. Differently, algorithms of nodes at each layer in the hierarchy can be selected independently of each other.

(2) Use of an Asynchronous Circuit to Implement a Column Readout Architecture Circuit.

In the present disclosure, an asynchronous circuit design is used to implement a node distributed column readout architecture, to reduce power consumption and noise of the pixel array. Therefore, the asynchronous circuit design is required first. On this basis, the node distributed column readout circuit is implemented based on a CMOS process. The asynchronous circuit design includes a handshake protocol and an asynchronous control logic circuit.

Figure 3:
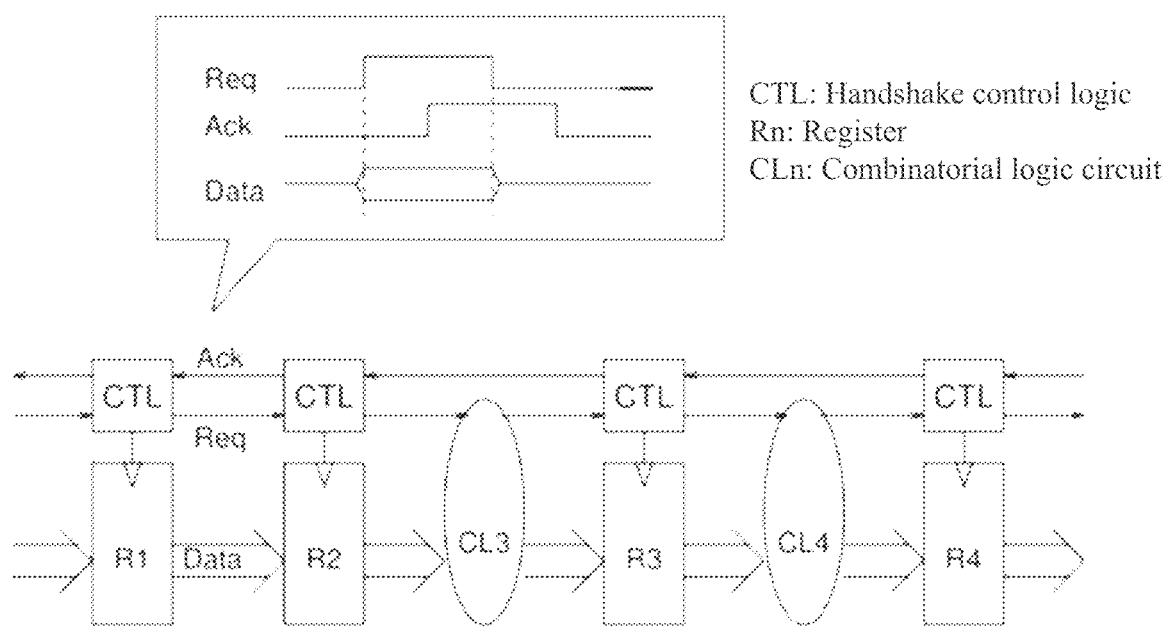
FIG. 3 is a structural diagram of an asynchronous circuit according to the present disclosure.

(a) Handshake protocol. Usually, a structure of an asynchronous circuit is shown in FIG. 3. Because there is no uniform clock in the asynchronous circuit, handshake signals (Request and Acknowledge) are directly sent between previous and next stages to ensure the correctness of data transmission. Therefore, handshake is the core of the asynchronous circuit design. Currently, handshake protocols in the asynchronous circuit mainly include a four-phase protocol and a two-phase protocol. In the four-phase handshake protocol, a transmitting end sends data first and sets a request signal (Req) to a high level. Then, a receiving end receives the data and sets an acknowledgement signal (Ack) to the high level. Subsequently, the transmitting end receives the acknowledgement signal (Ack) and then sets the request signal (Req) to a low level. Finally, the receiving end sets the acknowledgement signal (Ack) to the low level after the request signal (Req) switches to the low level. In the four-phase protocol, a communication process is marked by a level value. Each communication process requires Req and Ack to be "reset to zero". This leads to an unnecessary waste of time and power consumption. However, the two-phase protocol avoids such a case by focusing on level transitions. In the two-phase handshake protocol, a single flip (1 to 0 or 0 to 1) of the Req signal indicates a request, and then a single flip (1 to 0 or 0 to 1) of the Ack signal indicates a response to the request signal. In principle, the two-phase protocol is faster and consumes less power than the four-phase protocol. However, hardware overheads and power consumption required for specific implementations of the two protocols need to be considered comprehensively. Therefore, the present disclosure needs to study the impact of different handshake protocols on the performance, overheads, and power consumption on the readout architecture.

Figure 4A:
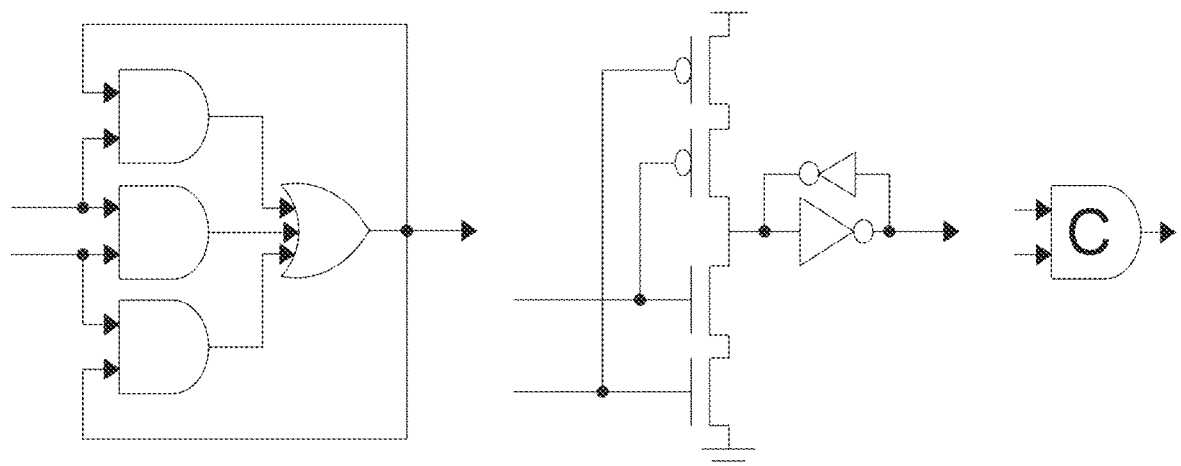
FIG. 4A is a structural diagram of a Muller C-element.
Figure 4B:
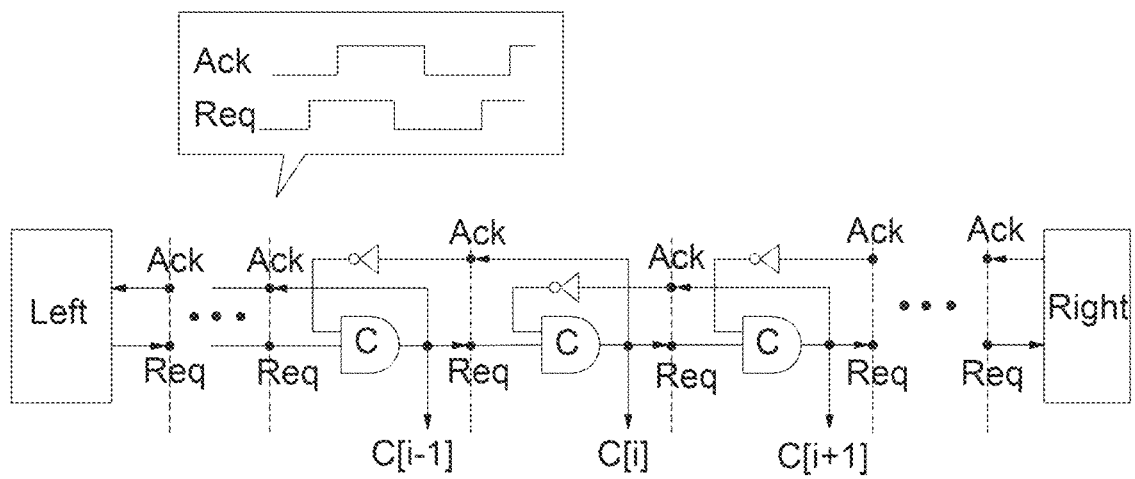
FIG. 4B is a structural diagram of a Muller pipeline.

Asynchronous control logic circuit. In the asynchronous circuit, Muller-C is a basic element (C-element for short) for implementing the handshake protocol control. FIG. 4A shows a gate-level circuit, a transistor-level circuit and a symbol of the C-element. The C-element is a state retention element, similar to an asynchronous set-reset latch. When both inputs of the C-element are 0, an output thereof is 0, while an output is 1 when both inputs are 1. For another input combination, an output remains unchanged. A Muller pipeline structure formed based on C-elements and inverters is configured to transfer handshake signals, as shown in FIG. 4B. The C-element corresponds to each pipeline stage of the pipeline, and is configured to synchronize a request signal from an upper stage and an acknowledgement signal from a lower stage and transfer the request without any glitches. It should be emphasized that this solution currently adopts a four-phase handshake, with an alternative solution of a two-phase handshake. An asynchronous circuit control logic structure of the four-phase handshake protocol used in this solution is shown in FIG. 4B, including Muller C-elements and inverters.

The detailed structure of the asynchronous circuit of this solution specifically includes:
 (a) a handshake control logic, which is the same as the Muller pipeline shown in FIG. 4B;
 (b) a combinatorial logic circuit, that is, the arbiter and multiplexer in FIG. 1 (a hexagon in FIG. 1); and
 (c) a register (Rn), that is, a level latch (Latch in FIG. 5A).

Figure 5A:
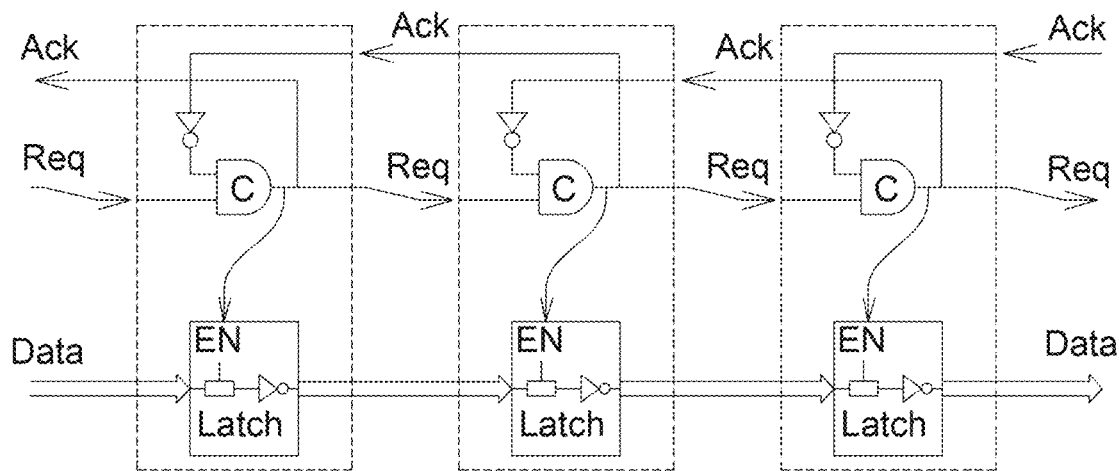
FIG. 5A is a diagram of an asynchronous circuit of a four-phase protocol pipeline.
Figure 5B:
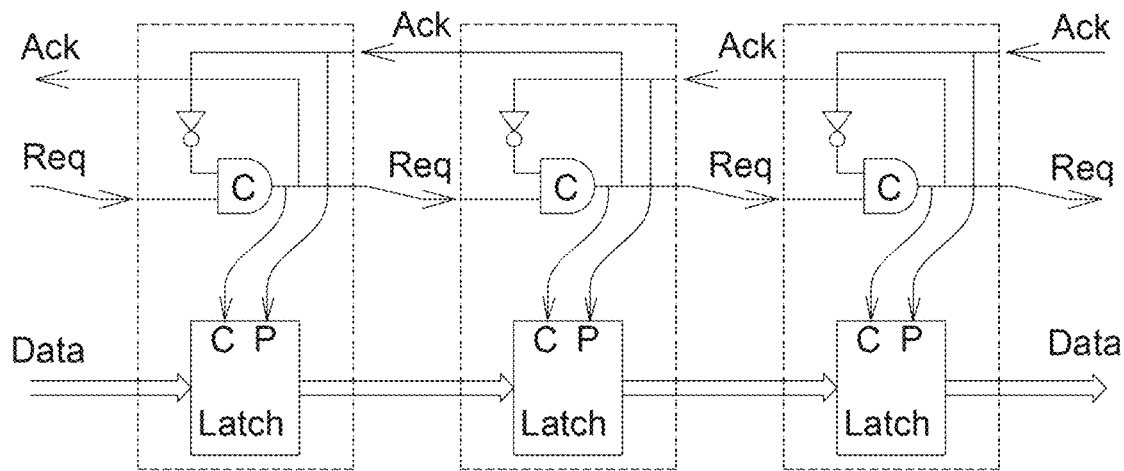
FIG. 5B is a diagram of an asynchronous circuit of a two-phase protocol pipeline.
Figure 6:
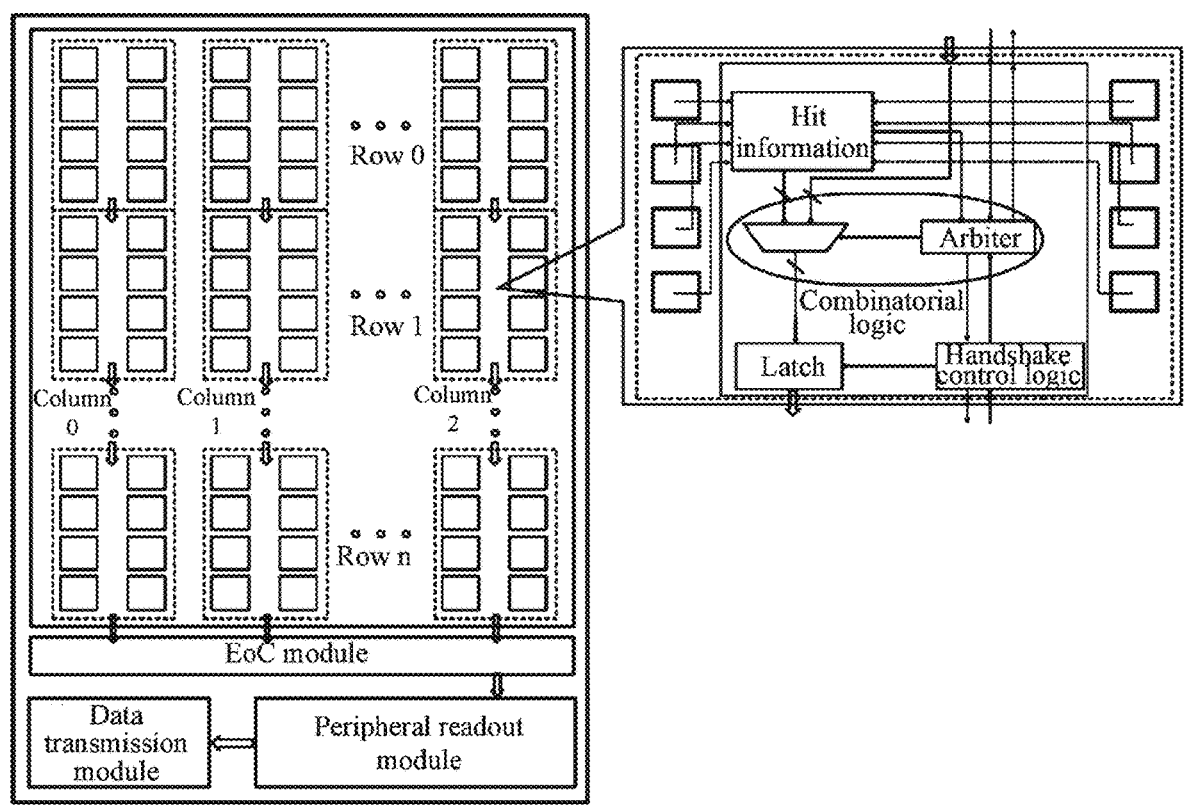
FIG. 6 is a structural diagram of a pixel detector chip of an asynchronous readout architecture.

FIG. 5A and FIG. 5B each show a shift register implemented by the asynchronous circuit. This can be expanded into various functional circuits by adding combinatorial logic between two pipeline stages. A four-phase protocol is used in FIG. 5A, and a two-phase protocol is used in FIG. 5B. In the two-phase circuit implementation, a control signal jump is utilized, and special capture-pass latches need to be introduced into the circuit: The transitions alternately occur at C and P input terminals of the latches, causing the latches to alternately switch between a capture mode and a pass mode. The capture-pass latches require more hardware overheads than ordinary latches for implementation. In the present disclosure, the four-phase and two-phase asynchronous circuits of the readout architecture are separately implemented based on basic structures such as C-elements and Muller pipelines. Readout rates, delays, power consumption, and areas are compared comprehensively.

The specific embodiments described herein are merely intended to illustrate the spirit of the present disclosure by way of example. A person skilled in the art can make various modifications or supplements to the specific embodiments described or replace them in a similar manner, without departing from the spirit of the present disclosure or exceeding the scope defined by the appended claims.

What is claimed is:

1. A high-speed complementary metal-oxide-semiconductor (CMOS) pixel detector, comprising:
 a plurality of super pixel modules, wherein each super pixel module comprises an array of N×M super pixel cells and a digital readout logic circuit connected to the N×M super pixel cells, and data is output between super pixel modules via asynchronous control logic; and
 peripheral modules, comprising at least an end of column (EoC) module, a peripheral readout module, and a peripheral data transmission module connected in sequence, wherein the EoC module is connected to the super pixel modules;
 wherein readout nodes of the super pixel modules communicate locally with each other, and propagate data downward in columns through registers in the readout nodes, during data transmission, a node-based readout architecture having a hierarchical structure with at least two layers is set, and the hierarchical structure with at least two layers comprises:
 a first node layer, comprising readout nodes of at least two super pixel modules, wherein an output from the first node layer is as a first node layer output; and
 a second node layer, comprising a plurality of first node layer outputs:
 wherein the readout node comprises at least an asynchronous control logic circuit, comprising:
 a plurality of registers, configured to store data output by a multiplexer:
 the multiplexer, configured to select data generated by super pixel cells in a node or data from super pixel cells in a previous node for output; and
 an arbiter, configured to control a selection of the multiplexer.

2. The high-speed CMOS pixel detector according to claim 1, wherein the digital readout logic circuit comprises:
 a HitMap cache, configured to cache hit information of hit super pixel cells;
 a readout node, configured to transmit data in the HitMap cache and a row address of a super pixel to the peripheral data transmission module; and
 configuration logic, configured to configure pixel cells in the super pixel.

3. The high-speed CMOS pixel detector according to claim 2, wherein when one of two inputs to the node is valid, the arbiter controls the multiplexer to transmit a valid input to a register; and when both inputs to the node are valid, the arbiter controls the multiplexer to prioritize transmission of data generated by a local super pixel.

4. The high-speed CMOS pixel detector according to claim 3, wherein each super pixel cell comprises an induction diode and an analog front-end circuit that are sequentially connected, wherein
 the induction diode is configured to collect an induction signal generated during a hit; and
 the analog front-end circuit is configured to amplify, shape, and digitize a small signal generated by the induction diode, wherein when a pixel in the super pixel is hit, hit information of all pixel cells in the super pixel is written into the HitMap cache.

5. The high-speed CMOS pixel detector according to claim 4, wherein the arbiter performs data control selection based on a local arbitration algorithm, comprising:
 a weighted round-robin algorithm, wherein for every t conflicts, the local super pixel is granted access to a data node, meaning that each arbiter in a column is weighted with an address of the data node;
 a longest-wait-first algorithm, wherein each data node stores a waiting time of each packet, a waiting counter is incremented in case of a conflict, and a packet with a long waiting time obtains access to the node; or
 an oldest-cell-first algorithm, wherein timestamps of two packets are compared and a packet with a smaller timestamp is always selected.

6. The high-speed CMOS pixel detector according to claim 5, wherein the readout node of each super pixel module performs data communication based on an asynchronous four-phase handshake protocol, wherein:
 a transmitting end sends data first and sets a request signal Req to a high level;
 a receiving end receives the data and sets an acknowledgement signal Ack to the high level;
 the transmitting end receives the acknowledgement signal Ack and then sets the request signal Req to a low level; and
 the receiving end sets the acknowledgement signal Ack to the low level after the request signal Req switches to the low level.

7. The high-speed CMOS pixel detector according to claim 6, wherein in the peripheral modules, the EoC module is configured to perform a handshake with a column, receive a data packet from the column, store the data packet in a first in, first out (FIFO), and then synchronize data to a peripheral clock domain, wherein the EoC module adds an address of a super pixel column to each packet, for subsequent identification;

the peripheral readout module is configured to read data from the EoC module in each column, and send the data to the peripheral data transmission module; and the peripheral data transmission module is configured to frame and encode the data sent by the peripheral readout module, perform parallel-to-serial conversion on the data, and then output the data at a high speed.

8. The high-speed CMOS pixel detector according to claim 7, wherein in the peripheral modules, a slow control and command decoder is configured to receive and parse data from outside a chip, and then implement a register configuration according to information obtained through parsing; and a configuration register is configured to configure a working state of a circuit in the chip.

* * * * *